(12) United States Patent
Zucker

(10) Patent No.: US 9,375,737 B1
(45) Date of Patent: Jun. 28, 2016

(54) VEHICLE UNDERCARRIAGE SNOW/ICE REMOVAL SYSTEM

(71) Applicant: JoAnn Zucker, Tomkins Cove, NY (US)

(72) Inventor: JoAnn Zucker, Tomkins Cove, NY (US)

( * ) Notice: Subject to any disclaimer, the term of this patent is extended or adjusted under 35 U.S.C. 154(b) by 0 days.

(21) Appl. No.: 14/695,975

(22) Filed: Apr. 24, 2015

(51) Int. Cl.
*A01G 27/00* (2006.01)
*B05B 7/16* (2006.01)
*B05B 1/20* (2006.01)
*B05B 13/00* (2006.01)
*B05B 12/12* (2006.01)
*B60S 3/04* (2006.01)

(52) U.S. Cl.
CPC ............... *B05B 7/1666* (2013.01); *B05B 1/20* (2013.01); *B05B 12/12* (2013.01); *B05B 13/005* (2013.01); *B60S 3/04* (2013.01)

(58) Field of Classification Search
CPC ................................................. B05B 7/1666
USPC .......................................................... 239/69
See application file for complete search history.

(56) References Cited

U.S. PATENT DOCUMENTS

| | | | |
|---|---|---|---|
| 4,324,307 A * | 4/1982 | Schittino | B60B 39/028 126/271.1 |
| 4,848,510 A * | 7/1989 | Ahmed | B60C 27/00 180/309 |
| 5,801,307 A | 9/1998 | Netzer | |
| 6,779,744 B1 | 8/2004 | Marine et al. | |
| 6,946,621 B1 | 9/2005 | Roseman | |
| 9,096,983 B1 * | 8/2015 | Mejia | E01H 10/007 |
| 2004/0262425 A1 * | 12/2004 | Sakai | B05B 12/12 239/128 |
| 2006/0124154 A1 | 6/2006 | Rivalto | |
| 2007/0056947 A1 | 3/2007 | Damian | |
| 2009/0211605 A1 | 8/2009 | Ahmad | |
| 2011/0155192 A1 | 6/2011 | Ahmad et al. | |
| 2013/0112765 A1 * | 5/2013 | Mercnik | A01G 25/00 239/1 |

* cited by examiner

*Primary Examiner* — Len Tran
*Assistant Examiner* — Adam J Rogers
(74) *Attorney, Agent, or Firm* — Thomas J. Germinario

(57) ABSTRACT

An apparatus for removing accumulated snow and/or ice from the undercarriage of a motor vehicle before it is parked in an indoor garage or parking lot includes a piping network with multiple jet/spray nozzles installed on the undercarriage and configured to direct nozzle sprays of pressurized heated antifreeze solution and nozzle jets of pressurized heated air to the perimeter areas of the undercarriage, including the wheel-wells, where snow/ice accumulation is most prevalent. Along with the network of nozzles, the undercarriage snow/ice removal apparatus includes a conductive and/or radiative heating grid covering the undercarriage perimeter areas to which the nozzle sprays and nozzle jets are directed. The undercarriage de-icing apparatus also includes multiple capacitive undercarriage icing sensors distributed throughout the de-icing areas.

3 Claims, 4 Drawing Sheets

VEHICLE UNDERCARRIAGE SNOW/ICE REMOVAL SYSTEM

FIELD OF INVENTION

The present invention relates to the field of devices and methods for clearing accumulated ice and snow from surfaces of a vehicle, vessel or aircraft, and more particularly to devices and methods for removing ice and/or snow from the undercarriage of a motor vehicle.

BACKGROUND OF THE INVENTION

The problems addressed by the present invention relate to the buildup of snow and/or ice on the undercarriage of a motor vehicle as it traverses snow/ice covered roadways and the subsequent melting of the accumulated snow/ice after the vehicle is parked in an indoor garage or parking lot. While snow/ice accumulations on the upper chassis of a vehicle can readily be scraped or brushed off by a motorist, such accumulations on the undercarriage are usually inaccessible and remain when the vehicle is parked indoors, resulting in the formation of melt puddles around the vehicle, through which the motorist must often wade when he/she returns to the vehicle. When the vehicle is parked in the motorist's home garage, the repeated exposure of garage floors and walls to melt water containing corrosive road salts requires troublesome cleanup and can cause deterioration of exposed surfaces.

The present invention is designed to mitigate these problems by providing an on-board system for removing snow and/or ice from the undercarriage of a vehicle that can be activated by the motorist, or can be self-activated, before the vehicle reaches its destination indoor parking area.

SUMMARY OF THE INVENTION

The present invention is an apparatus for removing accumulated snow and/or ice from the undercarriage of a motor vehicle before it is parked in an indoor garage or parking lot (collectively referred to hereinafter as an "indoor parking area"). In its most basic version, the apparatus comprises a piping network with multiple jet/spray nozzles installed on the undercarriage and configured to direct nozzle sprays of pressurized heated antifreeze solution and nozzle jets of pressurized heated air to the perimeter areas of the undercarriage, including the wheel-wells, where snow/ice accumulation is most prevalent. The jet/spray nozzles (hereinafter referred to simply as the "nozzles") are of the standard type well known in the art, wherein constriction of the exit orifice accelerates the exiting fluid velocity.

Some or all of the nozzles can also be of the rotary type, also well known in the art, wherein the momentum of the accelerated fluid expelled from the nozzles is applied angularly to turn the nozzles about an axis and direct the jet/spray in a circular pattern. The piping network and the nozzles are in pressurized fluid communication with one or more onboard spray reservoirs of antifreeze solution, which can be reservoirs that also supply the vehicle's engine cooling and/or window washing systems. The antifreeze solution supplied to the nozzles is heated by one or more spray heating means, which can comprise one or more electrical resistive heating elements and/or a diversion of some of the heated antifreeze solution from the engine cooling system. The piping network also pneumatically communicates with one or more onboard air jet sources of pressurized heated air, which can include ambient air heated by one or more electrical resistive heating elements and/or by one or more heat exchangers using engine and/or exhaust heat.

Along with the network of nozzles, the undercarriage snow/ice removal apparatus comprises a conductive and/or radiative heating grid covering the undercarriage perimeter areas to which the nozzle sprays and nozzle jets are directed (hereinafter referred to as the "de-icing areas"). The undercarriage heating grid can comprise electrical resistive heating elements, a piped diversion of heated engine fluids, or a combination of both. The undercarriage de-icing apparatus further comprises multiple capacitive undercarriage icing sensors distributed throughout the de-icing areas, which are adapted to detect the presence or absence of snow, ice and/or moisture based on the differential relative permittivity of water in its solid and liquid phases. Examples of such capacitive icing sensors are disclosed in U.S. Pat. No. 5,801,307 and U.S. Patent Publication 2007/0056947, both of which disclosures are incorporated herein by reference.

The operation of the undercarriage de-icing system is controlled by an on-board central processing unit (CPU), which can be a component of the vehicle's overall CPU or computer system. The CPU interfaces with the other system components and, upon detection by the icing sensors of an undercarriage icing condition (i.e., the presence of ice and/or snow), either automatically initiates operation of the system or alerts the motorist to initiate the operation manually (e.g., by pressing a control button). Upon activation of the de-icing system, the CPU is configured and programmed to first initiate energizing of the undercarriage heating grid. When the effect of the heating grid is detected by the icing sensors as a beginning of a solid-to-liquid water phase transition, the CPU is configured and programmed to next activate the piping network and nozzles to direct the nozzle sprays of pressurized heated antifreeze solution to the de-icing areas. Once the effect of the nozzle sprays is detected by the icing sensors as a completion of a solid-to-liquid water phase transition, the CPU is configured and programmed to next activate the piping network and nozzles to direct the nozzle jets of pressurized heated air to the de-icing areas. When the effect of the nozzle jets is detected by the icing sensors as absence of moisture on the de-icing areas, the CPU is configured and programmed to terminate the de-icing operation by de-activating the piping network and nozzles.

Optionally, the CPU can also be interfaced with an on-board navigation system so that the de-icing system is activated only when the vehicle is approaching an indoor parking area destination. This feature avoids repeated activations of the de-icing system en route to an indoor parking destination and thus conserves energy and antifreeze fluids.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
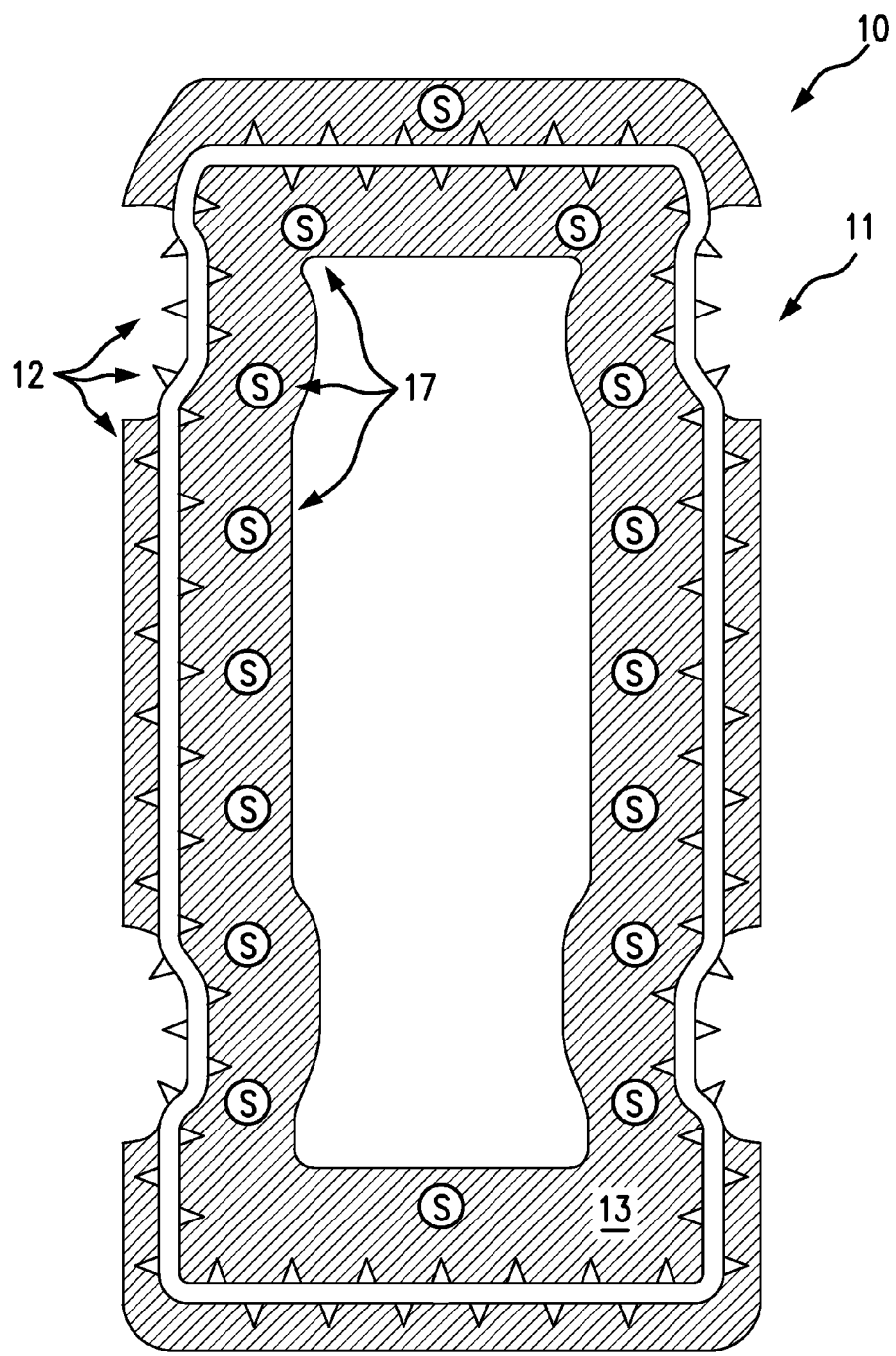
FIG. 1 is a plan view of the undercarriage components of the de-icing system, according to the preferred embodiment of the present invention.
Figure 2:
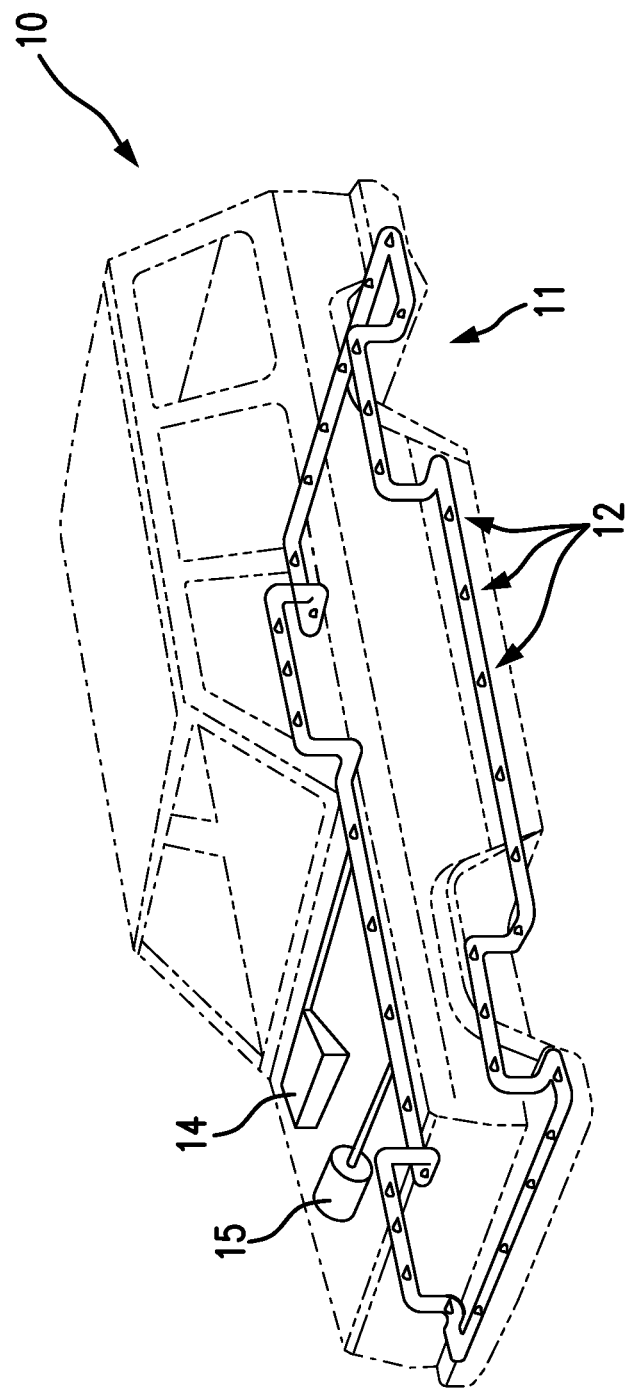
FIG. 2 is a cut-away perspective view of the of the de-icing system, according to the preferred embodiment of the present invention.

Referring to FIGS. 1 and 2, the components of the exemplary undercarriage de-icing system 10 comprise the piping network 11, which contains multiple nozzles 12 distributed along the piping 11 and directed toward the de-icing areas 13 along the perimeter of the undercarriage and in the wheelwells. The nozzles 12 are configured to direct nozzle sprays of a pressurized, heated antifreeze solution and nozzle jets of pressurized, heated air at the de-icing de-icing areas 13. The piping network 11 and nozzle 12 are in pressurized fluid communication with an onboard spray reservoir 14, which contains the antifreeze solution and a heating element. The piping network pneumatically communicates with an onboard pressurized air tank 15 with a heating element.

Figure 3:
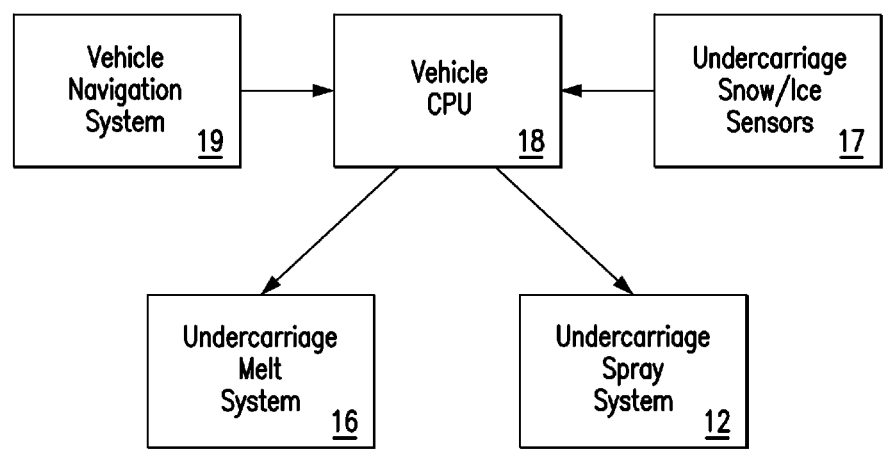
FIG. 3 is a schematic view of the CPU interfaces with the de-icing system components, according to the preferred embodiment of the present invention.

An electrical resistive heating grid 16 covers the de-icing areas 13 of the undercarriage. Distributed throughout the de-icing areas 13 are multiple capacitive icing sensors 17, which are interfaced with a system CPU 18, as depicted in FIG. 3. The CPU 18 controls the undercarriage melt/heating system 16, as well as the undercarriage spray/jet nozzles 12. Optionally, the CPU 18 can also interface with a vehicle navigation system 19, so that initiation of undercarriage de-icing operations can be timed to coincide with the vehicle's approach to an indoor parking area.

Figure 4:
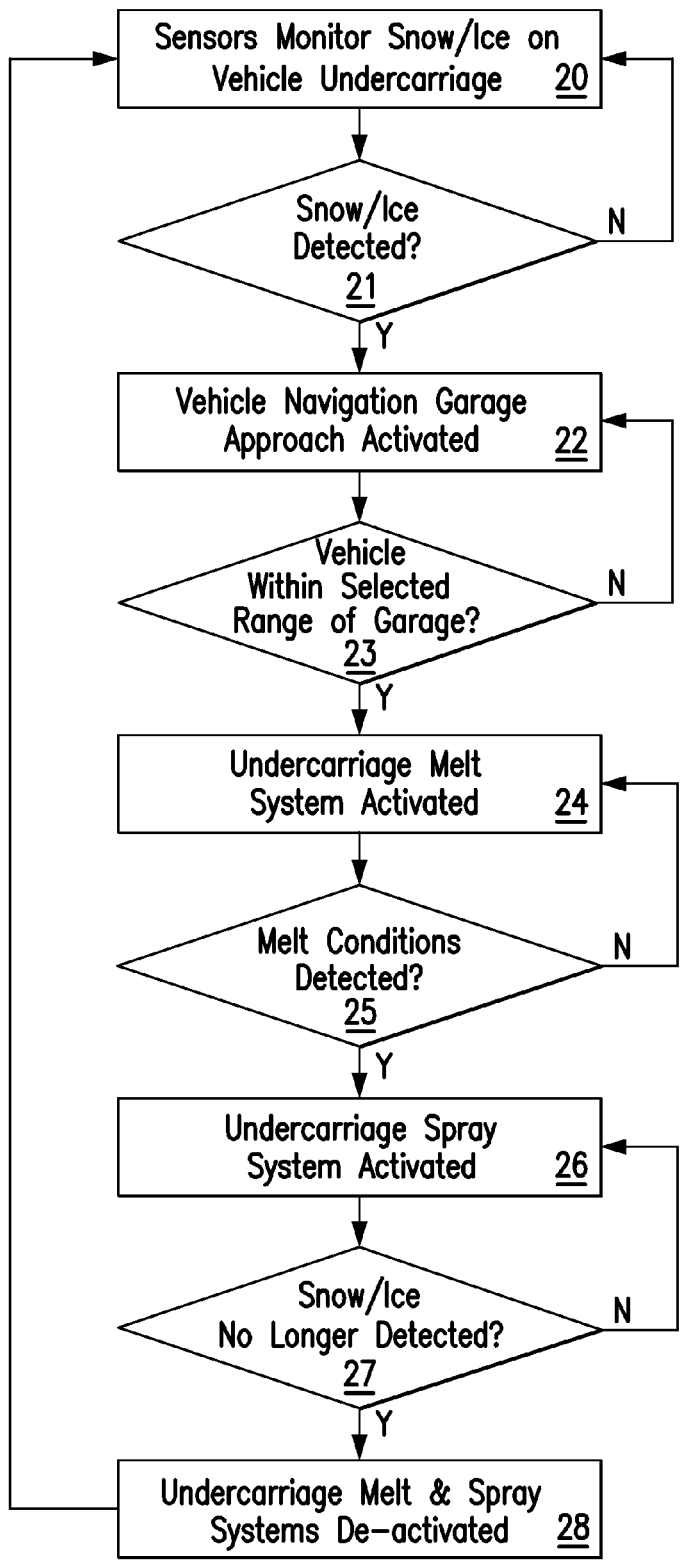
FIG. 4 is a flowchart of the operations of the undercarriage de-icing system, according to the preferred embodiment of the present invention.

FIG. 4 depicts an exemplary de-icing sequence implemented by the CPU 18 in conjunction with the other system components. The icing sensors monitor accumulation of snow and/or ice on the undercarriage 20. Upon detection of snow/ice 21, the CPU interfaces with the vehicle navigation system 22 to determine if the vehicle is within a selected range of an indoor parking destination 23. If so, the CPU activates the heating grid to initiate melting of the undercarriage snow/ice 24. When the undercarriage icing sensors detect melting of the snow/ice 25, the CPU sequentially activates the nozzle sprays and nozzle jets to complete the snow/ice removal and drying of the undercarriage 26. When the icing sensors no longer detect snow, ice or liquid water in the de-icing areas 27, the CPU de-activates the melt and spray components 28, and the icing sensors return to monitoring status 20.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A de-icing apparatus for removing accumulations of snow and ice from an undercarriage of a vehicle, comprising:
a piping network with multiple nozzles that is installed on the undercarriage, wherein the nozzles are adapted and configured to direct nozzle sprays of a pressurized heated antifreeze solution and nozzle jets of pressurized heated air to one or more de-icing areas of the undercarriage;
one or more onboard spray reservoirs containing the antifreeze solution, wherein each of the spray reservoirs is in pressurized fluid communication with the piping network and the nozzles;
one or more spray heating means, which are adapted and configured to heat the antifreeze solution;
one or more onboard air jet sources of the pressurized heated air;
an undercarriage heating grid that is installed on the undercarriage and is adapted and configured to heat the de-icing areas of the undercarriage;
multiple capacitive undercarriage icing sensors, which are distributed throughout the de-icing areas, and which are adapted and configured to detect a presence or an absence of water in either a solid or a liquid phase and to distinguish the solid phase of water from the liquid phase of water based on the different relative permittivities of the solid phase of water and the liquid phase of water;
an onboard central processing unit (CPU), which is interfaced with and controls multiple de-icing system components, comprising the piping network, the nozzles, the spray reservoirs, the spray heating means, the air jet sources, the undercarriage heating grid, and the undercarriage icing sensors, wherein the CPU is adapted, configured and programmed to activate the de-icing system components sequentially according to a system activation sequence, whereby the accumulations of snow and ice on the undercarriage are melted and resulting moisture is evaporated.

2. The de-icing apparatus of claim 1, wherein the CPU is adapted, configured and programmed to implement the system activation sequence comprising a detection stage, a heating stage, a spraying stage, a drying stage, and a terminations stage, and wherein in the detection stage the CPU is configured and programmed to interface with the undercarriage icing sensors and to initiate the heating stage upon a detection of the presence of solid phase water on the undercarriage, and wherein in the heating stage the CPU is configured and programmed to activate the undercarriage heating grid and to interface with the undercarriage icing sensors and to initiate the spraying stage upon a detection of an incipient solid-to-liquid water phase transition on the undercarriage, and wherein in the spraying stage the CPU is configured and programmed to direct the nozzle sprays to the de-icing areas and to interface with the icing undercarriage sensors and to initiate the drying stage upon a detection of a completed solid-to-liquid water phase transition on the undercarriage, and wherein in the drying stage the CPU is configured and programmed to direct the nozzle jets to the de-icing areas and to interface with the undercarriage icing sensors and to initiate the termination stage upon a detection of an absence of either solid phase water or liquid phase water on the undercarriage, and wherein in the termination stage the CPU is configured and programmed to deactivate all of the de-icing system components, with the exception of the undercarriage icing sensors.

3. The de-icing apparatus of claim 2, further comprising an onboard navigation system, which is interfaced with the CPU, wherein the CPU is configured and programmed to delay initiation of the system activation sequence until the vehicle is within a specified distance of an indoor parking area destination, as determined by the onboard navigation system.

* * * * *